UNITED STATES PATENT OFFICE.

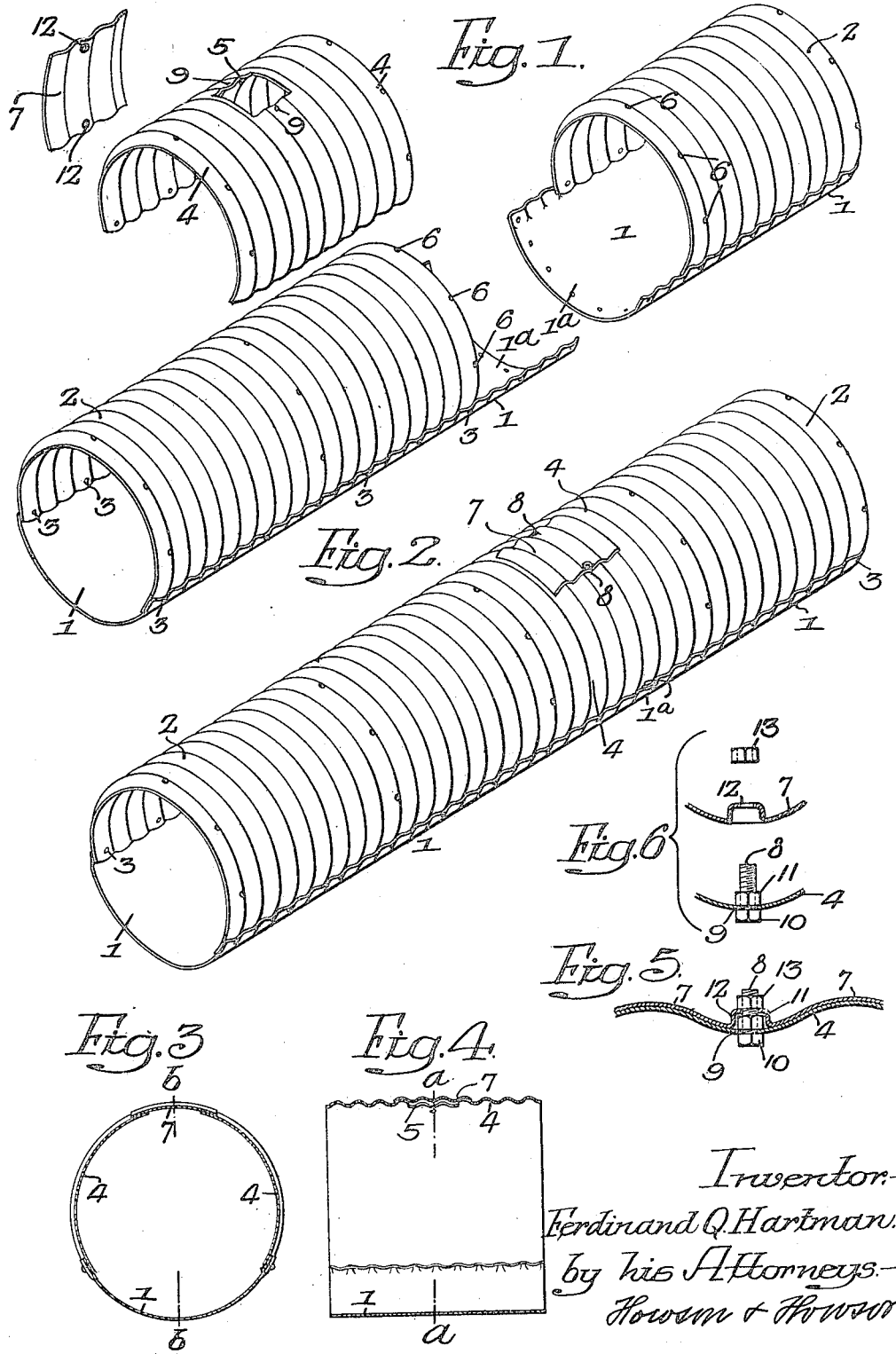

FERDINAND Q. HARTMAN, OF DANVILLE, PENNSYLVANIA.

DRAIN-PIPE.

1,259,232.  Specification of Letters Patent.  Patented Mar. 12, 1918.

Application filed June 2, 1915. Serial No. 31,739.

*To all whom it may concern:*

Be it known that I, FERDINAND Q. HARTMAN, a citizen of the United States, and a resident of Danville, county of Montour, State of Pennsylvania, have invented certain Improvements in Drain-Pipes, of which the following is a specification.

My invention relates to certain improvements in culvert pipes, particularly of the corrugated type.

One object of my invention is to design the culvert pipe so that long sections can be joined at the center, for instance, without materially weakening the culvert at the center.

A further object of the invention is to provide means whereby the sections of the pipe can be coupled together without the necessity of a man entering the pipe at one end.

The invention is particularly adapted for pipes having a small diameter, which would not admit of the entrance of a man.

In the accompanying drawing:—

Figure 1, is a perspective view, illustrating my improved joint, showing the parts in position ready to be assembled;

Fig. 2, is a perspective view, showing the parts assembled;

Fig. 3, is a transverse sectional view, showing the parts assembled as in Fig. 2, the section being taken on the line *a—a*, Fig. 4;

Fig. 4, is a longitudinal sectional view on the line *b—b*, Fig. 3;

Fig. 5, is a sectional view illustrating the fastening means assembled; and

Fig. 6, is a view showing the fastening means separated prior to being assembled.

The drawings illustrate a culvert pipe having a smooth bottom section and a corrugated upper section riveted, or otherwise secured to the bottom section, but it will be understood that the invention can be applied to a culvert pipe in which the sections are corrugated at the bottom, as well as at the top.

1 is the smooth bottom portion of the pipe. 2 is the upper portion which is corrugated and which is secured to the lower portion by a series of rivets or other fastenings 3. Both of these portions are made in sections, according to the width of the material being used and the sections are preferably staggered so that the transverse joints of the upper and lower sections will not be in line. Where a long section of culvert pipe is to be used such, for instance, as across a road or street, these pipes are usually made in short lengths and the lengths are secured together when the pipe is on the ground ready to be placed in position and, in the ordinary construction, this joint is comparatively weak and is the first place to show weakness when the road wears. Furthermore, in pipes of small diameters it is difficult to properly secure the two lengths firmly together.

By my invention, I materially strengthen this joint and the entire joint can be assembled without the necessity of entering the pipe.

The ends 1ª of the bottom sections 1 of the pipe extend beyond the ends of the upper sections 2 of the pipe, as shown clearly in Fig. 1, and a coupling section 4 of corrugated sheet metal is fitted over these ends and is riveted or bolted thereto; the ends being secured together by a series of bolts which pass through the holes clearly shown in Fig. 1.

In order to make a neat joint, in the present instance the upper edges of the plain bottom section 1 are corrugated and fit the corrugations of the upper section.

In the coupling section 4 is a hand hole 5 through which the arm of the workman can be passed to reach the line of rivets or bolts which extend through the holes 6 in each of the upper sections and also to reach the rivets or bolts securing the coupling section 4 to the portions 1ª of the lower section. 7 is the corrugated cover plate which closes the opening 5 and which is secured in place by bolts 8. The bolts may be made as shown in Figs. 5 and 6 and each bolt is passed through a hole 9 in the coupling plate 4 and is held in place by its head 10 and a nut 11. The cover plate 7 is shaped to form a socket 12 which fits over the nut 11 so that the cover plate will rest snugly on the coupling plate 4 and nuts 13 hold the cover plate 7 firmly to the plate 4.

Thus it will be seen that I am enabled to make a very substantial joint, which is as strong as any other portion of the pipe and the sections of the pipe can be assembled without having to enter the pipe from one end and, when assembled, the joint section entirely incloses the pipe and makes a smooth surface for the free flow of water therethrough.

I claim:

The combination of a culvert pipe composed of upper and lower sections secured together, the lower section at one end of each length extending beyond the upper section, the two lower sections being secured together; a short upper coupling section located above both of the extensions of the lower sections and secured to the edges thereof and also to the upper sections of the two adjoining pipes, said coupling section having a hand hole in such position that a hand can be passed into the hand hole to hold the rivets while the coupling section is being fastened to the pipes; a cover for the hand hole; and means for clamping the cover in position.

FERDINAND Q. HARTMAN.

Copies of this patent may be obtained for five cents each, by addressing the "Commissioner of Patents, Washington, D. C."